T. W. GRAHAM.
DEVICE FOR KILLING VERMIN ON LIVE STOCK.
APPLICATION FILED OCT. 20, 1916.
1,233,871.  Patented July 17, 1917.
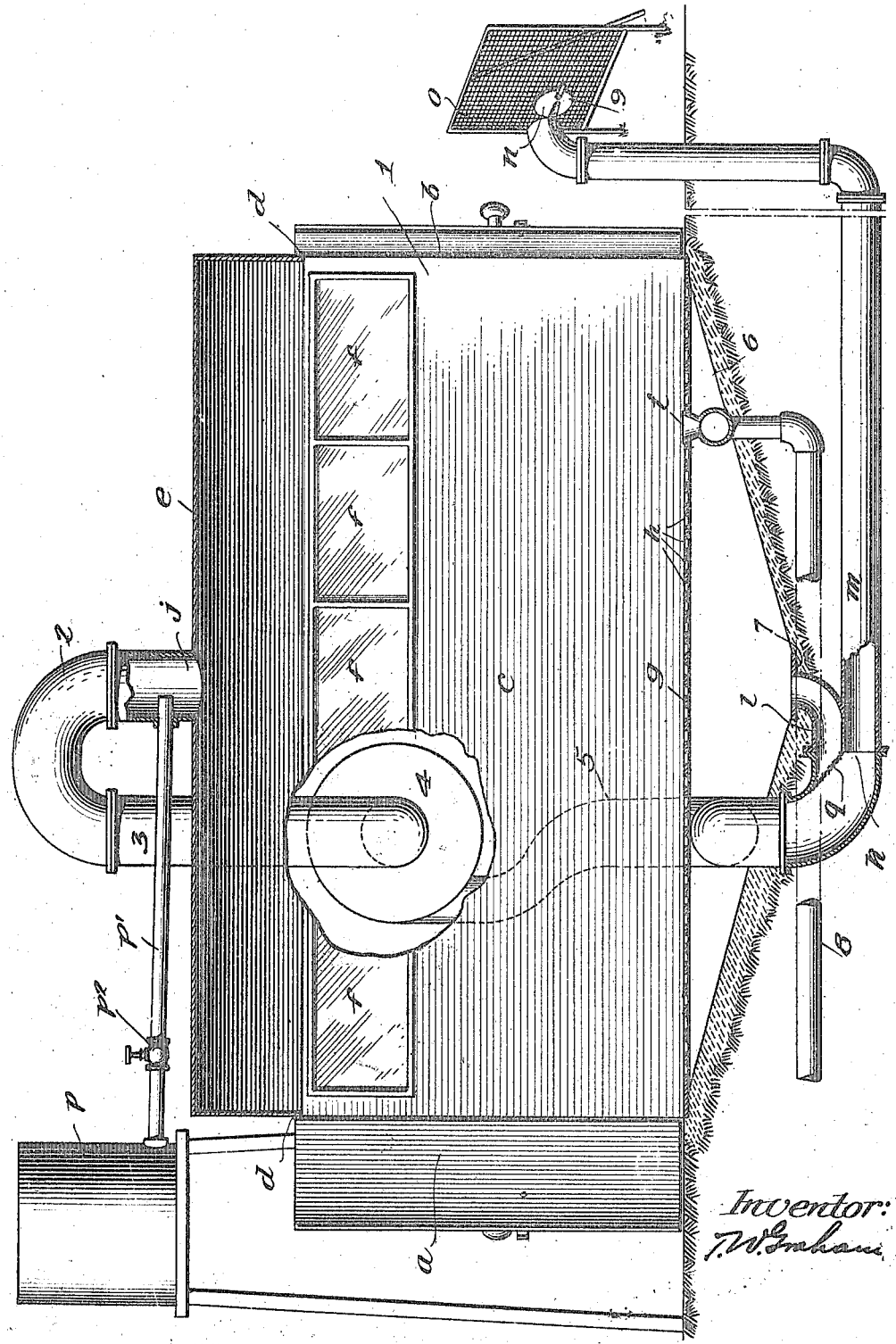
Inventor:
T. W. Graham

UNITED STATES PATENT OFFICE.

THOMAS W. GRAHAM, OF MYRTLE, MISSISSIPPI.

DEVICE FOR KILLING VERMIN ON LIVE STOCK.

1,233,871.  Specification of Letters Patent.  Patented July 17, 1917.

Application filed October 20, 1916. Serial No. 126,796.

*To all whom it may concern:*

Be it known that THOMAS W. GRAHAM, a citizen of the United States, residing at Myrtle, in the county of Union, State of Mississippi, has invented a new and useful Device for Killing Vermin on Live Stock; and it is declared that the following specification is a full, clear, and exact description of the invention, such as will enable others skilled in the art to which it appertains to make and use the same.

This invention relates to a new and useful device for killing vermin on live stock.

One of the objects of the invention is to provide a structural frame or housing of elongated contour, but which may be of any suitable shape otherwise and provided with closures at both ends through which the live stock may pass in entering and leaving the housing, in combination with a perforated floor, through which a strong current of air saturated with the fumes from a suitable chemical solution may be blown through the housing, that is upwardly through the perforations of the bottom, whereby the vermin may be blown from the animals and conveyed through a conduit and against a screen buffer.

A further object of the invention is the provision of means for conveying the exhaust from a gas engine into and through the housing to assist in blowing the vermin from the animals.

A further object of the invention is to provide a sloping or conical foundation under the perforated floor, in combination with one branch of a blow pipe (which extends from a suitable blower) which extends into and fits the center of the sloping foundation, whereby the chemically saturated air may be blown upwardly through said perforations. The vermin, when blown from the animals, are carried with the current of air, through a pipe in the top of the housing, which pipe is connected to said blower, in which case the vermin pass through the blower and then through the blow pipe.

Another object of the invention is to provide a screen deflector, to deflect the vermin from the branch (which opens in the center of the foundation) into and through an exit or exhaust pipe. The vermin, when leaving the exhaust pipe, are thrown with considerable force against the screen buffer, and if the chemically treated air is not sufficient to kill the vermin, it is found that the force of the blow against the screen buffer will completely destroy the life of the vermin.

In practical fields, the details of construction may necessitate alterations falling within the scope of what is claimed.

The invention comprises further features and combination of parts, as hereinafter set forth, shown in the drawings and claimed.

Referring more especially to the drawings in which a single view is illustrated, 1 designates a suitable housing which comprises parallel side walls $c$, a suitable top $e$ (which is tapering), there being openings $d$ at both ends of the housing, which openings are designed to be closed by the doors $a$ and $b$. The parallel side walls of the housing are provided with suitable window sashes in which panes of glass $f$ are arranged, to permit light to enter the interior of the housing. Mounted upon a suitable frame, is a conventional form of tank $p$, from which a pipe $p'$ extends, the same being provided with a valve $p^2$. The tank is designed to contain a suitable chemical solution which is deadly to the vermin, and by means of the valve $p^2$, the solution from the tank may be controlled. Rising from the top $e$ of the housing is a pipe $j$ through which a suction or draft is created upwardly from the housing, as hereinafter set forth. This pipe $j$ merges into a curved portion 2, which in turn is connected to a downwardly extending pipe 3 which is disposed to one side of the housing. The downwardly extending pipe 3 is connected to a suitable blower 4, from the lower part of which a pipe 5 extends. This pipe 5 is connected to an elbow $k$, which merges into two branches $l$ and $m$, the branch $m$ constituting an exhaust pipe for the vermin and a part of the air from the blower. Where the two branches $l$ and $m$ adjoin, the branch $l$ is provided with a screen deflector 2. The housing is provided with a flooring $g$, which is provided with perforations $h$. Below the flooring, a suitable pit 6 is provided. This pit is conical or slopes to a common center 7, upwardly through which the branch $l$ extends. A suitable pipe 8 is provided, which may be connected to the exhaust of any suitable gas engine (not shown), whereby the exhaust may pass through the pipe 8 (one end of which terminates upwardly through the flooring $g$ of the housing) and into the housing, thereby assisting in blowing the vermin from the animals or live stock. At the end of the exhaust, a closure $n$ is hinged, which closure may be held latched by the member 9. In the path of the outlet end of the exhaust $m$ a screen buffer $o$ is disposed. In operation, the live stock enter the housing by opening the door $a$. The blower is then operated, drawing air through its side, which is forced through the pipe 5, the greater portion of which air passes through the branch $l$ and upwardly through the pit, and then through the perforations of the floor, and owing to a suction being created in the pipes $j$ and 3, the air is drawn thereinto. Owing to the outlet pipe $p'$ extending through the wall of the pipe $j$ and terminating on its interior, the air as passing through said pipe becomes saturated with the fumes from the chemical solution, hence, this chemically saturated air passes through the blower, and makes the same circuit as before, blowing the vermin from the live stock, as well as exterminating the life of the vermin. The exhaust from gas engine passes out of the outlet end $i$ of the exhaust pipe into the interior of the housing, and combines with the air from the branch $l$, to assist in blowing the vermin upwardly in order to be drawn through the pipe $j$. This exhaust also becomes saturated with the fumes from the chemical solution. The greater portion of the air passes through the branch $l$, but the vermin are deflected by the screen $q$ to and through the pipe $m$, and every now and then the closure $n$ is opened so that the vermin are blown against the screen buffer $o$, and if life of the vermin is not entirely extinct, life is completely destroyed from the force of the vermin against the buffer. When the live stock is in the housing, the doors $a$ and $b$ are temporarily closed. A certain amount of the chemical solution in the form of a liquid is also carried through the pipe $j$, and sprays upwardly through the perforations $h$ of the floor, in order to be sprayed upon the animals. After thoroughly spraying the animals and blowing the vermin therefrom the door $b$ may be opened to permit the exit of the live stock.

The invention having been set forth, what is claimed as new and useful, is:—

In a device for spraying and killing vermin on live stock, a conical pit to be constructed in the ground, and a housing constructed over the pit and provided with doors at both ends, a perforated floor over the pit, a blower, a blow pipe extending from the blower and terminating in a vermin exhaust branch and a branch for the air from the blower, the air branch communicating with the pit through its center, a closure for the outlet end of the vermin exhaust branch, a screen buffer in the path of the outlet end of the vermin exhaust branch, a pipe connecting said blower and the top of the housing, in which suction is created, means for injecting a deadly chemical solution into said suction pipe, and means for conveying the exhaust from a gas engine to and through the perforated floor of the housing.

THOMAS W. GRAHAM.